United States Patent [19]
Mott

[11] Patent Number: 5,193,570
[45] Date of Patent: Mar. 16, 1993

[54] ELECTRONIC CONTROL UNIT FOR AUTOMATIC SPRINKLING SYSTEM

[76] Inventor: Paul W. Mott, 2315 El Paseo, Las Cruces, N. Mex. 88001

[21] Appl. No.: 851,963

[22] Filed: Mar. 16, 1992

[51] Int. Cl.5 ............................................. F16K 17/36
[52] U.S. Cl. ..................................... 137/78.2; 239/70; 137/624.12
[58] Field of Search ........................ 137/78.2, 624.12; 239/70

[56] References Cited

U.S. PATENT DOCUMENTS

| | | | |
|---|---|---|---|
| Re. 31,204 | 4/1983 | Sanner | 137/78.3 |
| 2,776,860 | 1/1957 | Griffis | 299/25 |
| 2,991,938 | 7/1961 | Norcross | 239/64 |
| 3,140,720 | 7/1964 | Griswold | 137/78.2 |
| 3,212,714 | 10/1965 | Davis et al. | 137/78.2 |
| 3,500,844 | 3/1970 | Sanner | 137/78.2 |
| 4,059,227 | 11/1977 | Hunter | 137/78.2 |
| 4,304,989 | 12/1981 | Vos et al. | 137/624.2 |
| 4,644,786 | 2/1987 | Jacobsen et al. | 73/171 |
| 4,921,001 | 5/1990 | Pittsinger | 137/78.2 |

*Primary Examiner*—A. Michael Chambers
*Attorney, Agent, or Firm*—Hoffman, Wasson & Gitler

[57] ABSTRACT

An automatic irrigation and sprinkling system for applying irrigation water or airborne dispersed water to a particular area. A precipitation sensor is included for incrementing a counter based upon the sensed precipitation. During a scheduled irrigation event, power is applied to the system to open one or more solenoid valves to control the flow of water. This main power signal would flow uninterruptedly to the solenoid valves only if the counter was at a predetermined value. A value greater than this predetermined value during a scheduled irrigation event would cause the power to be interrupted to the solenoid valves and would allow the counter to begin decrementing. If the value of the counter reaches this predetermined value during the scheduled irrigation event, power would again be supplied to the solenoid valves, thereby supplying water to the predetermined area.

14 Claims, 9 Drawing Sheets

ELECTRONIC CONTROL UNIT FOR AUTOMATIC SPRINKLING SYSTEM

BACKGROUND OF THE INVENTION

Several thousands of years ago, the human species evolved from a hunting society in which food had to be captured and people constantly traveled in pursuit of food, to a farming society in which their nomadic existence ceased and settlement was made in areas of plentiful water or precipitation. At this time, the total number of humans which inhabited the earth was relatively low so that settlements could easily be made in favorable locations for the growing and production of food.

However, the worldwide population explosion of the last 200 years has forced people to inhabit areas which are less than hospitable for the production of food. Typically, farming communities have moved further and further away from a source of running water or precipitation in the form of rain and snow. Man, with his ingenuity, has compensated for this lack of natural water by producing many types of irrigation systems in which water is transported over a long distance through pipes, culverts, conduits or similar devices for the purpose of drip or area irrigation. Historically, these systems were rather crude since they did not allocate a specific amount of water to each plant or area based upon the needs of the crop or the amount of precipitation which had recently fallen in the area.

Consequently, a number of systems have been developed in which automatic irrigation and sprinkling systems water lawns and crops, based partly upon the amount of precipitation which has fallen on a particular area. Typical systems of this type are described in U.S. Pat. Nos. 2,776,860 issued to Griffis and 2,991,938 issued to Norcross. Both of these patents accumulate rain water in various containers and disable an irrigation solenoid valve until the water accumulated in these containers is eliminated. Specifically, the water accumulated in the Griffis patent is eliminated in a gradual nature, whereas the water accumulated in the Norcross container is eliminated in a series of discrete drain events. Therefore, if an irrigation event, i.e., the sprinkling of water in a large area or drip irrigation to a specific plant, is scheduled when water is still contained in the container, this irrigation event will be partially or completely cancelled. Although the systems do operate in a manner to save water or to prevent over-watering, these systems do not always operate in an efficacious manner, especially when several irrigation events are immediately proceeded by a rainfall.

SUMMARY OF THE INVENTION

The present invention overcomes the deficiencies in the prior art by providing a system in which a measure of rainfall is mechanically eliminated from the system, or an electronic counter having a value based upon the measured rainfall is decremented only during the irrigation event. In both situations, the present invention would adjust the water application time of an irrigation area in response to rain. In addition, the system would be calibrated in such a manner as to deduct the amount of scheduled application time such that the application area receives a predefined quantity of water regardless of whether the water is supplied by the irrigation system or by precipitation. In this manner, if all of the water would be mechanically eliminated from a water collection system or an electronic counter is decremented to indicate that all of the water has been evaporated or similarly eliminated, water would be provided for an irrigation event which has previously been scheduled. If an irrigation event has previously been scheduled but the present invention indicates that the electronic counter has not been sufficiently decremented, water would still be supplied to the event if it has been determined that during the course of this irrigation event, the electronic counter has been properly decremented.

The present invention accomplishes its result by utilizing one or more sprinklers, drip irrigation devices or similar means of introducing water to a specific area or crop, whereby the output of water for each source is controlled by a solenoid valve. Additionally, for purposes of clarity, the present invention will be primarily discussed with respect to decrementing the electronic counter.

A precipitation control device is connected to the electronic counter which is controlled by a controller module. Based upon the amount of water collected or sensed by a precipitation sensor, the electronic counter would be incremented in a stepwise manner. If, during a preprogrammed irrigation event, the counter exhibits a zero output, power would pass between a source of power and the solenoid valves associated with each water output source to properly irrigate the land. However, if the counter module exhibits a value greater than zero during this irrigation event, the power between the power source and the solenoid valves would be interrupted. During this irrigation event, if the output of the counter module is greater than 0, a properly calibrated alarm cycle would decrement the counter module at a proper rate. Therefore, the present invention would determine the proper length of time a previously scheduled irrigation event should proceed based upon the rainfall sensed by the system. The present invention would therefore insure that water is not wasted and that the crops are properly irrigated.

BRIEF DESCRIPTION OF THE DRAWINGS

The foregoing and other objects, features and advantages of the present invention will become more apparent from the following more particular description of the preferred embodiment of the invention, as illustrated in the accompanying drawings.

DETAILED DESCRIPTION OF THE INVENTION

Figure 1:
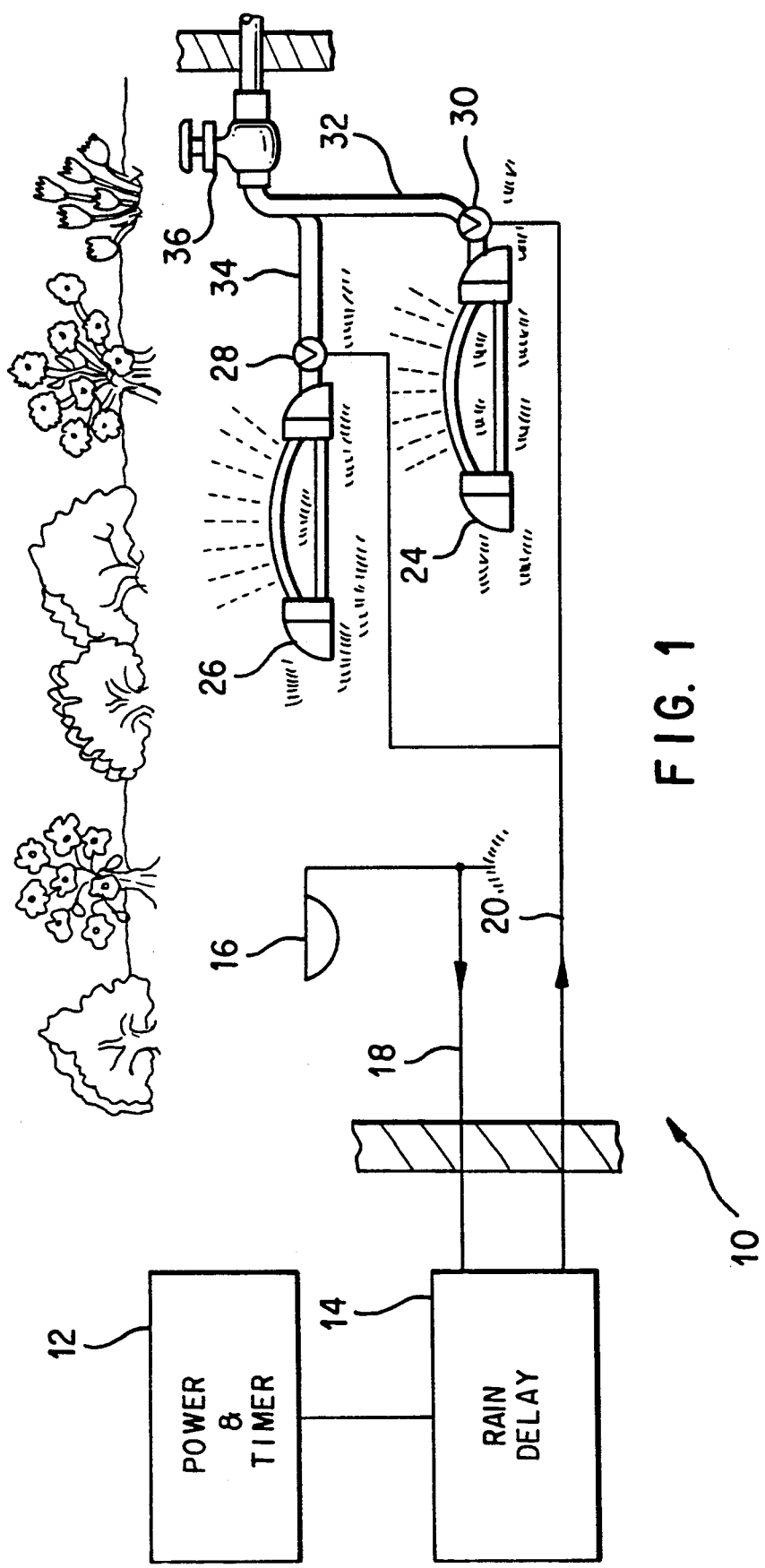
FIG. 1 is a pictorial description of the present invention.

FIG. 1 shows a pictorial illustration of the present invention 10 utilized to control water distribution to lawns or crops. Although various types of water distribution devices can be utilized, for illustrative purposes only, FIG. 1 shows the use of two sprinklers 24, 26 to distribute water over a particular area. A power supply 12 is used to supply power to the system. This power supply could be supplied from a 24 volt AC source or can be internal to the system. This power supply is conducted through what is denoted as the rain delay module 14. A water accumulation sensor, such as a tip bucket 16 is used to determine the amount of rainfall which has been received in a particular area. Generally, this water sensor is provided in a location which would not record the amount of water distributed by the sprinklers 24, 26. Information relating to the amount of precipitation sensed by the sensor 16 is transmitted to the rain delay module 14 via a typical electrical conductor 18. If it is determined that, based upon the amount of precipitation sensed by the sensor 16, a particular irrigation event should go on as scheduled, power to open solenoid valves 28, 30 associated with sprinklers 26 and 24 respectively, is sent from the rain delay module 14 via an electrical conductor 20. Water is to be supplied to sprinklers 24, 26 utilizing water hoses 32, 34, respectively. A standard tap faucet 36 is also used to control the supply of water to the sprinklers.

Figure 2B:
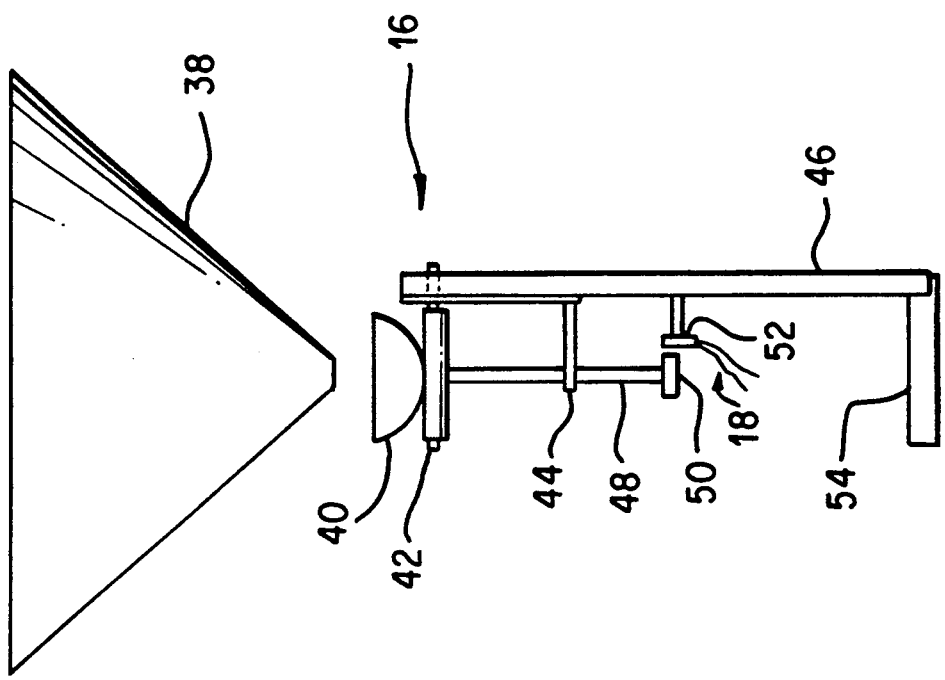
FIG. 2B is a side view of a tip bucket sensor.
Figure 2A:
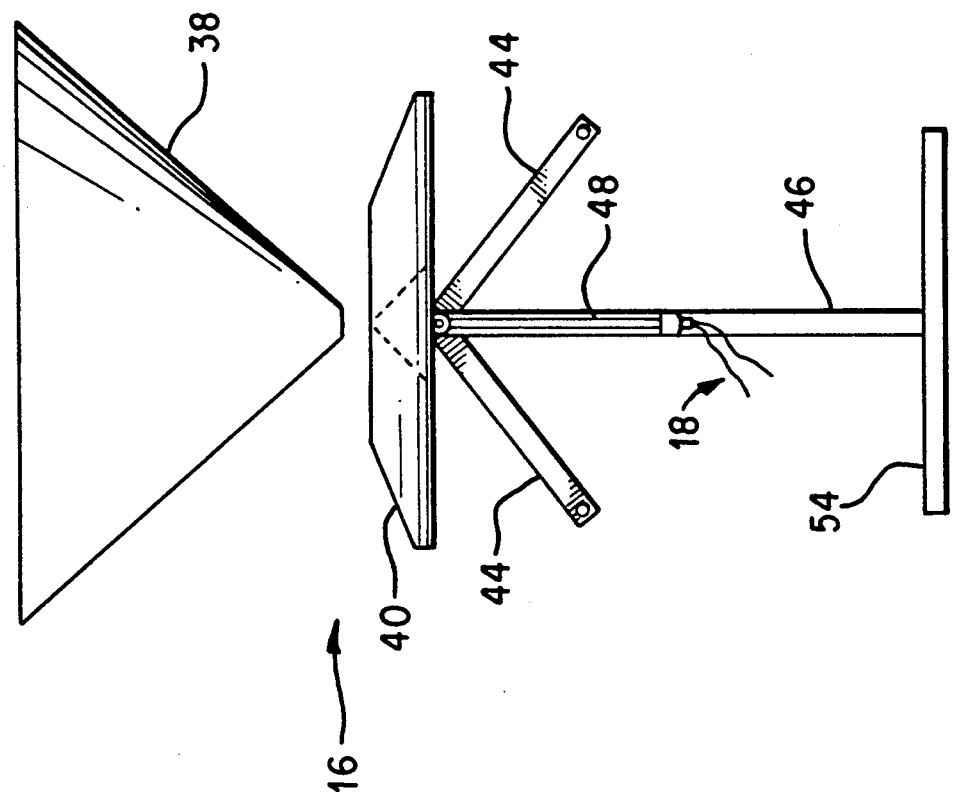
FIG. 2A is a front view of a tip bucket sensor.

FIGS. 2A and 2B illustrate a typical tip bucket water sensor which can be utilized in conjunction with the present invention. This water sensor is described in some detail in U.S. Pat. No. 4,644,786 issued to Jacobsen et al. As previously indicated, the type of water sensor which is utilized is not crucial to the present invention and the tip bucket described in these drawings is for illustrative purposes only. As shown in these drawings, water is diverted into a tip bucket 40 through a funnel 38. This tip bucket is supported by a bushing fulcrum 42 connected to a stand 46 having a base 54. Tip angle limiters 44 are also connected to the stand 46 to limit the travel of the tip bucket 40. A rotating lever 48 provided with a magnet 50 at its bottom end is connected to the tip bucket 40. A reed switch 52, having conductors 18, is attached to the stand 46. When a predetermined amount of precipitation is received by the tip bucket 40, the tip bucket is caused to rotate downward allowing the magnet 50 of the lever 48 to pass in proximity to the reed switch 52, momentarily closing this normally opened switch. Each time this reed switch is closed, a signal is sent to the input module 56 shown in FIG. 3.

Figure 3:
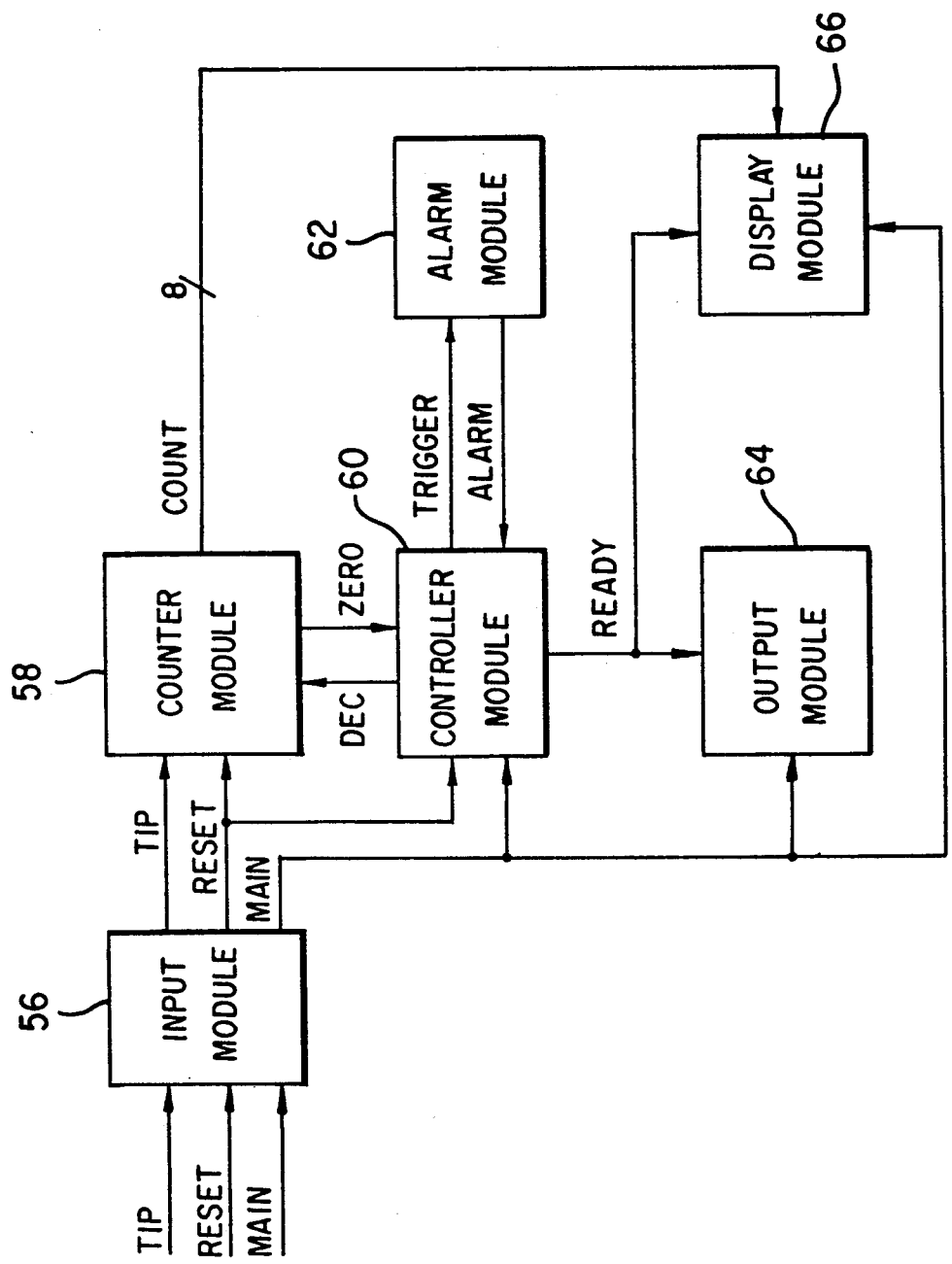
FIG. 3 is a block diagram of the system of the present invention.

FIG. 3 depicts a system block diagram of the rain delay module 14 consisting of an input module 56, a counter module 58, a controller module 60, an alarm module 62, an output module 64 and a display module 66. The system is connected in series with the power source 12 required to activate the solenoid valves 28 and 30. The circuitry of this module 14 constantly monitors the power line and can determine if the activation power for these valves is present, thereby interrupting the flow of current before it reaches the solenoid valves 28, 30.

The purpose of the input module 56 is to interface the rain delay module with the external environment. The input module is provided with a tip bucket switch input, a reset switch input and the 24 volt alternating solenoid power of the host irrigation system. The output of this module contains three logical signals and a 5 volt DC power signal for the rain delay circuit board provided in the controller module 60.

Figure 4:
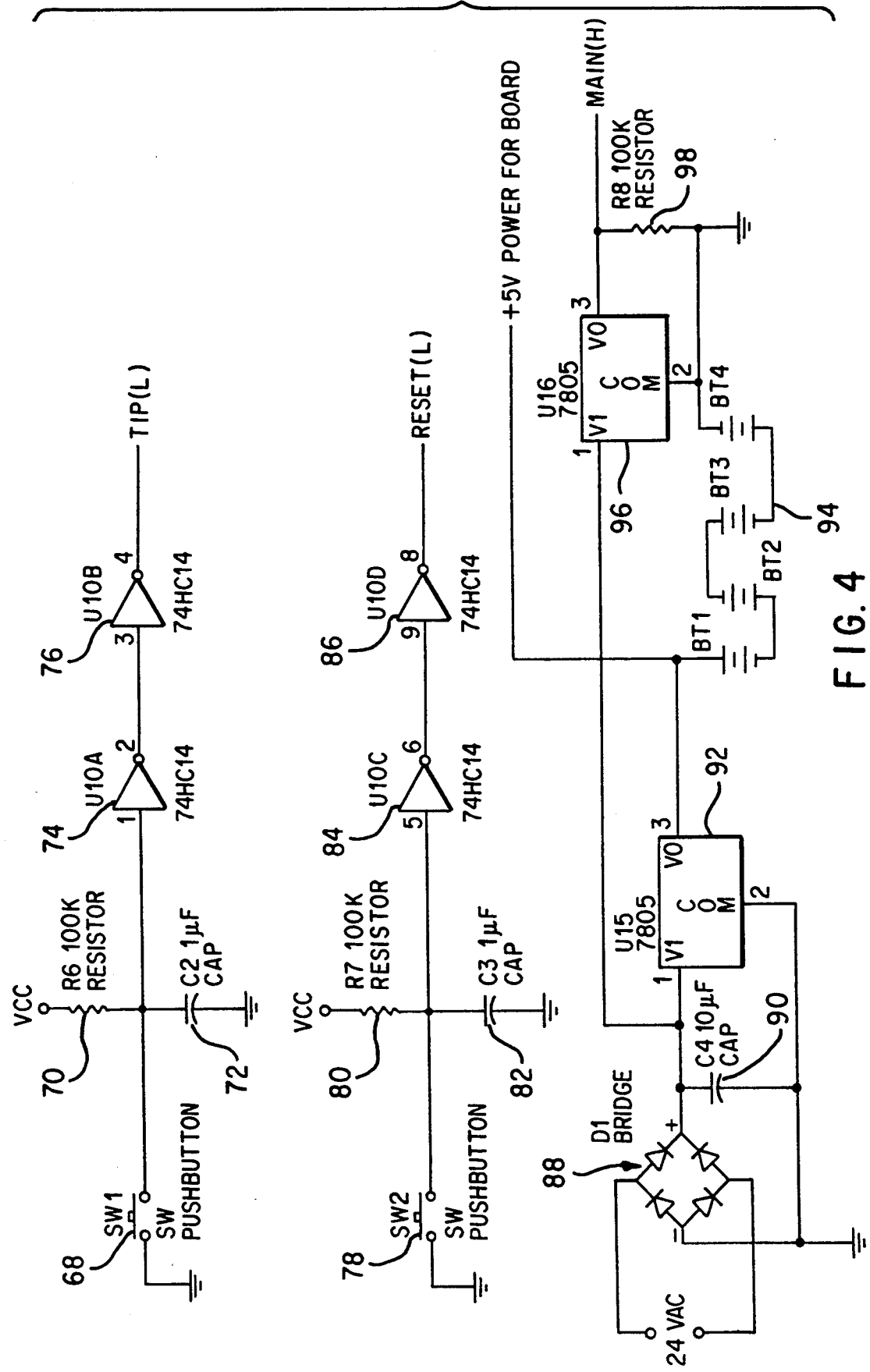
FIG. 4 is a circuit diagram of the input module of the present invention.
Figure 5:
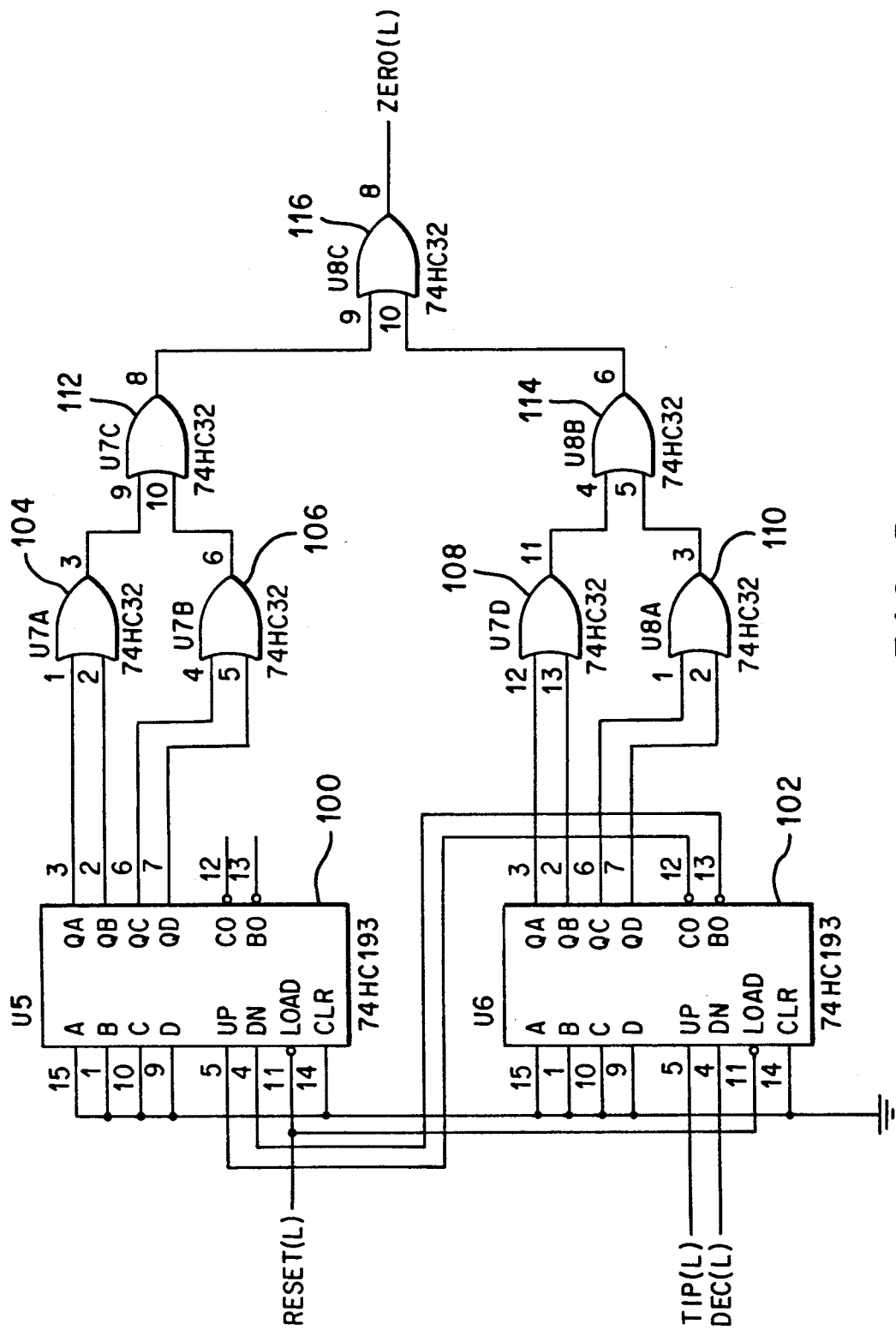
FIG. 5 is a circuit diagram of the counter module of the present invention.

FIG. 4 illustrates the input module circuitry and includes a push button switch 68 connected to the reed switch 52 of the tip bucket. Switch 68 is normally open except for the brief period when the tip bucket tips. Resistor 70, capacitor 72 and amplifiers 74 and 76 are used to monitor the status of switch 68. When this switch closes, the capacitor 72 and the two amplifiers 74, 76 de-bounce and condition a lower logical pulse which is transmitted to the counter module 58.

Push button switch 78 is used as a reset switch and it is normally open except for the brief period when the user depresses this switch. Resistor 80, capacitor 83 and amplifiers 84 and 86 are used to monitor the status of this switch 78. When this switch 78 closes, capacitor 82 and amplifiers 84, 86 de-bounce and condition a low logical pulse which is transmitted to both the counter module 58 and the controller module 60.

The input module 56 also includes a diode bridge 88 for converting the 24 volt AC host power supply into a filtered direct current voltage. Voltage regulator 96 and resistor 98 connected to the output of the diode bridge would produce a 5 volt direct current signal whenever the host solenoid power is present. The resistor 98 would hold the main power output signal at zero whenever the host solenoid power is not present. Whenever the host solenoid power is not present, a number of nickel-cadmium batteries 94 supply the power to the system. A voltage regulator 92 connected to the nickel-cadmium batteries are also used for this purpose. When the host solenoid power is present, the nickel-cadmium batteries 94 are recharged.

The counter module 58 receives tip as well as reset pulses from the input module 56 as well as a decrement pulse from the control module 60. The counter module produces a zero pulse transmitted to the controller module 60 as well as a count pulse transmitted to the display module 66. The purpose of the counter module is to determine, based upon the amount of precipitation sensed by the tip bucket 16 as well as a decrement schedule calibrated to match the water application area, to open the solenoid valves if water is required to be applied during an irrigation event. The counter module includes two mod-4 counters 100, 102 cascaded to form a single mod-8 counter. Whenever a low reset signal is received by the counter, the counter is immediately reset to zero. Whenever a low tip signal is sensed by the counter, it is immediately incremented by one. Whenever a low decrement signal is received by the counter, the counter is decremented by one. OR gates 104, 106, 108, 110, 112, 114 and 116 are used to form the logical sum of all eight counter bits. The final output is true (low), if, and only if, the counter is at zero. At this point, this zero signal is sent to the control module 60.

Figure 6:
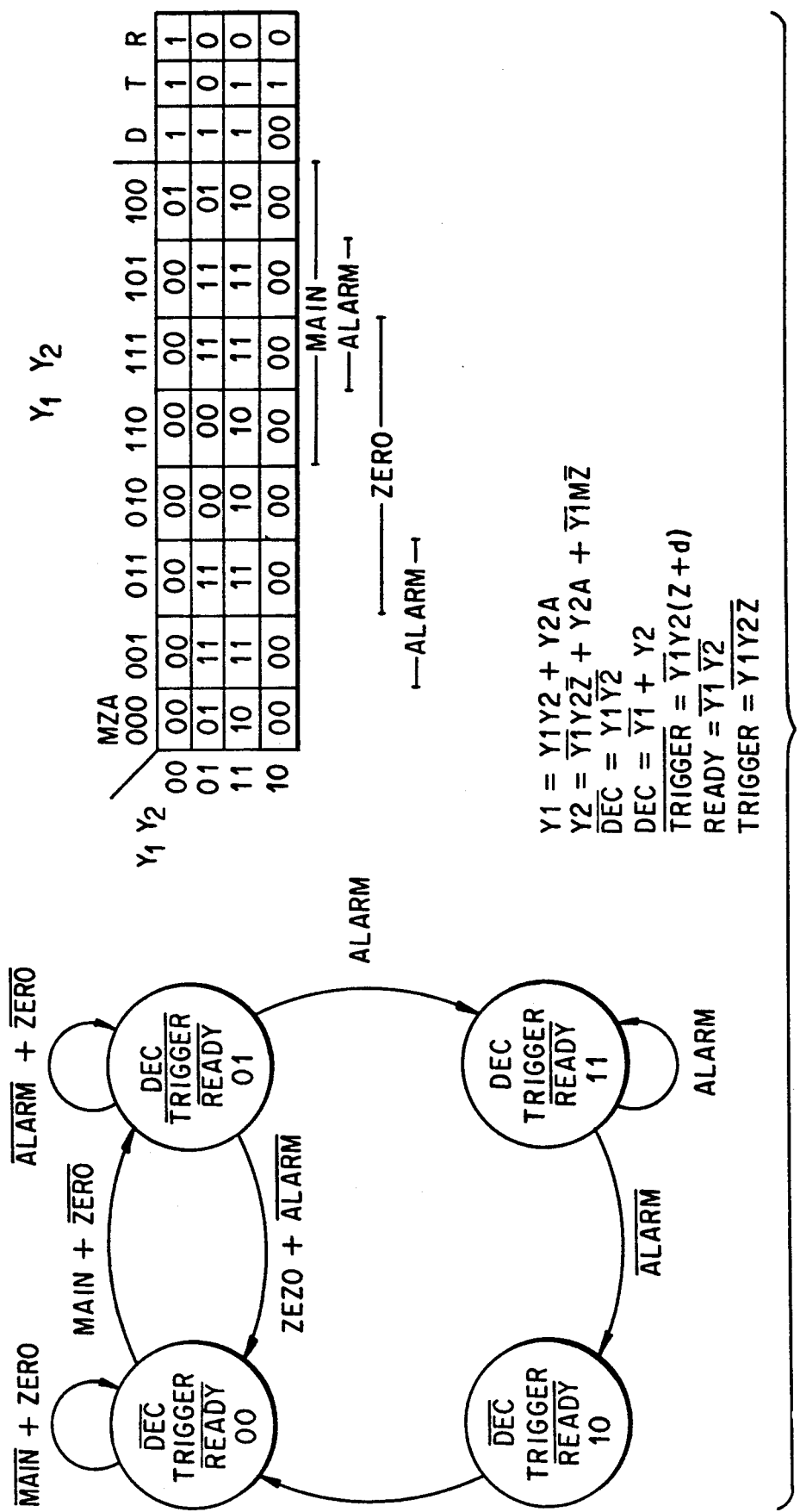
FIG. 6 is a functional design drawing of the controller of the present invention.

The control module 60 implements a Moore type finite state sequencer shown in FIG. 6. The controller maintains two state variables Y1 and Y2 having four unique states. The input to the controller module is an alarm signal from the alarm module 62 indicating the rate at which the counters 100, 102 are decremented as well as a signal from the counter module 58 indicating that the counter is at a zero level. Additionally, the control module receives a signal indicating that the main host solenoid power is present in the system. The control module produces a low decrement signal to the counter module 58, a low trigger signal to the alarm module 62 as well as a high ready signal to the output module 64.

The design of the controller module is illustrated with respect to FIG. 6. Initially, the system would reset to state 00 in which the low decrement and low trigger signals are false and the high ready signal is true. These outputs indicate that the tip counter should not be decremented, an alarm cycle should not be initiated and the host solenoid power should be passed uninterrupted. At this point, if the tip bucket tips, the tip counter is no longer at zero, and a low zero signal is false. If, at this point, the host solenoid power is activated (a high main signal is true), then the controller advances to state 01. In this state, the low decrement and high ready signals are false and the low alarm signal is true. These outputs would indicate that the tip counter should not be decremented, the alarm cycle should be initiated, and the host solenoid power should be interrupted.

The controller remains in state 01 until the alarm module is ready to begin a new alarm cycle or the tip counter becomes zero. When this occurs, the high alarm signal would be true and the controller would advance to state 11. In this state, low trigger signals as well as a high ready signal are all false. These outputs would indicate that the tip counter should not be decremented, an alarm cycle should not be initiated, and the host solenoid power should be interrupted.

The controller remains in state 11 until the alarm cycle is completed. When the alarm cycle terminates, i.e., a high alarm signal is false, the controller would advance to state 10. In state 10, a low trigger signal as well as a high ready signal are false and a low decrement signal is true. These outputs indicate that the tip counter should be decremented, the alarm cycle should not be initiated and the host solenoid power should be interrupted. The controller would then decrement the tip counter by one and immediately returns to state 00.

The actions of the controller are modeled by the finite state diagram shown in FIG. 6. The logical requirements of the controller are modeled with the K-map. With standard techniques, the K-map is used to obtain the state equations for the state variables Y1 and Y2 and the output equations for the output signals D, T and R (decrement, trigger and ready, respectively).

Figure 7:
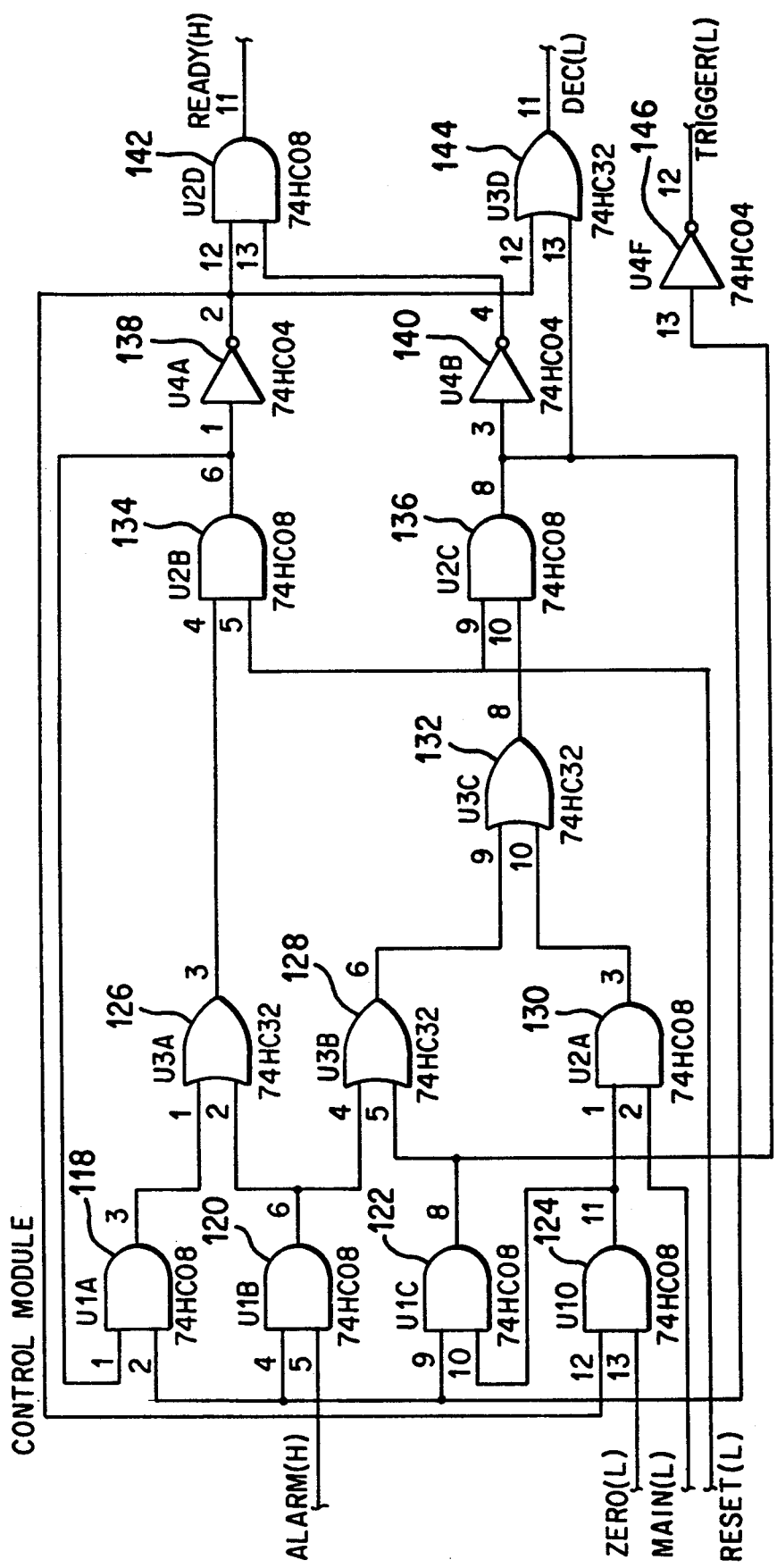
FIG. 7 is a circuit diagram of the controller of the present invention.
Figure 8:
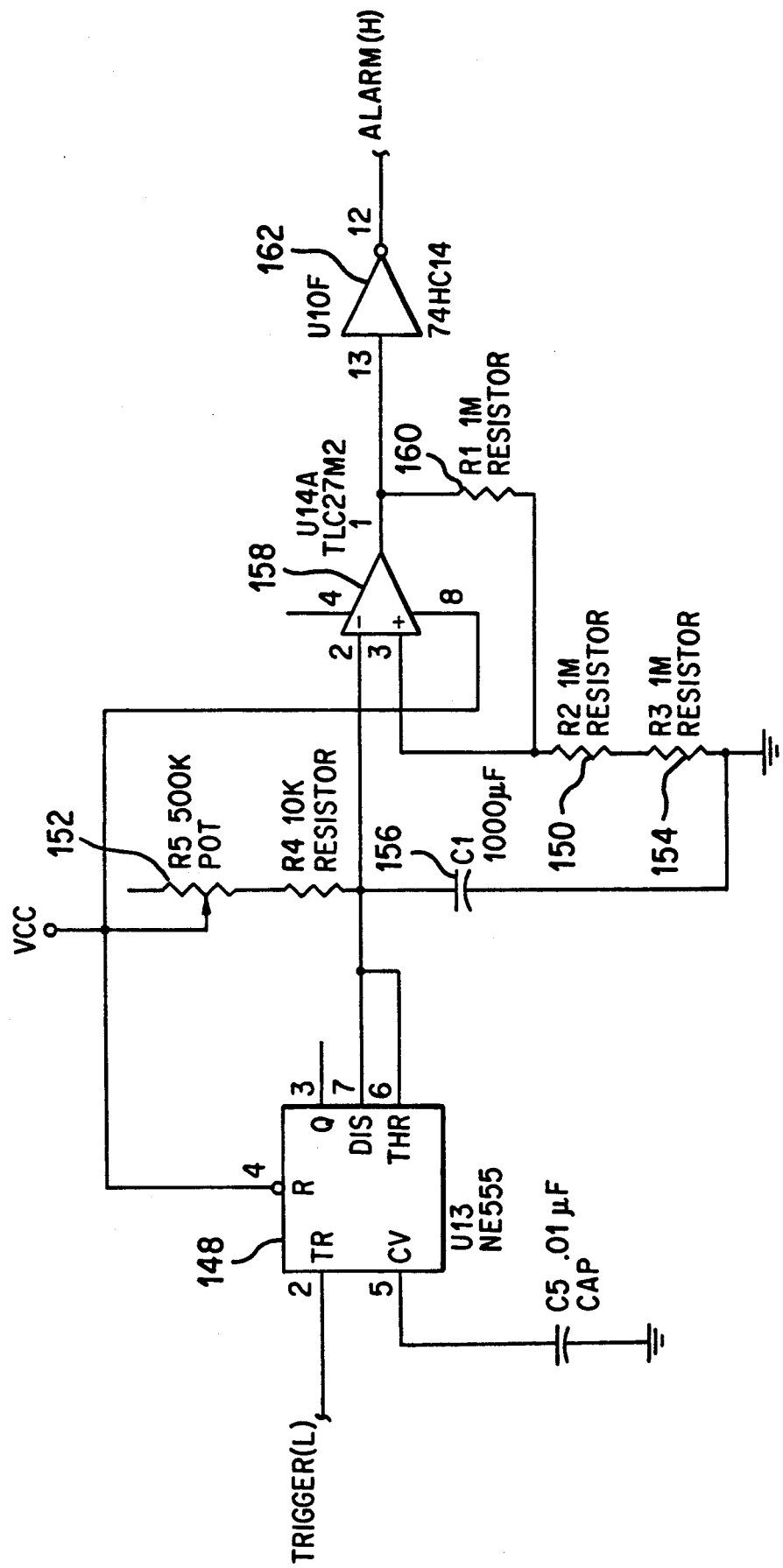
FIG. 8 is a circuit diagram of the alarm module of the present invention.

The circuitry of the control module is illustrated in FIG. 7 and would utilize AND gates 118, 120, 122, 124, 130, 134, 136 and 142 as well as OR gates 126, 128, 132 and 144 and amplifiers 138, 140 and 146 to implement the controller using standard feedback techniques. The layout of the circuit follows exactly from the state equations for Y1 (the output of AND gate 134) and Y2 (the output of AND gate 136) and the output equations for the high ready signal as well as the low decrement and trigger signals.

The alarm module 62 is utilized to calibrate the rain delay module 14 in such a manner as to decrement the counter module at a predetermined rate. The alarm module 62 implements an alarm clock with an adjustable one-shot circuit. The input to this module 62 from the control module 60 is a low trigger signal. The output from the alarm module 62 is a high alarm signal to the control module 60. The alarm module 62 includes a 555 timer 148 configured to act as a one-shot timer. When a low trigger signal is true, the timer 148 would begin to charge capacitor 156 at a rate determined by the adjustable resistor 152. The range of adjustment for this circuit could extend from approximately 60 to 600 seconds for a full charge. When the charge on capacitor 156 reaches approximately $\frac{2}{3}$ its full charging voltage, the timer 148 would ground pin 7 and the capacitor 156 would discharge as rapidly as possible. The alarm module also includes a high impedance operational amplifier 158 configured as a Schmidt trigger. When the voltage across capacitor 156 exceeds approximately $\frac{1}{3}$ its charging voltage, the operational amplifier 158 would produce a low voltage output, which is converted by amplifier 162 into a high alarm signal, indicating that an alarm cycle is transpiring. When the voltage across capacitor 156 falls below approximately $\frac{1}{3}$ the charge in voltage, the output of operational amplifier 158 would produce a higher voltage and the amplifier 162 would indicate that the alarm module is ready to begin another alarm cycle.

Figure 9:
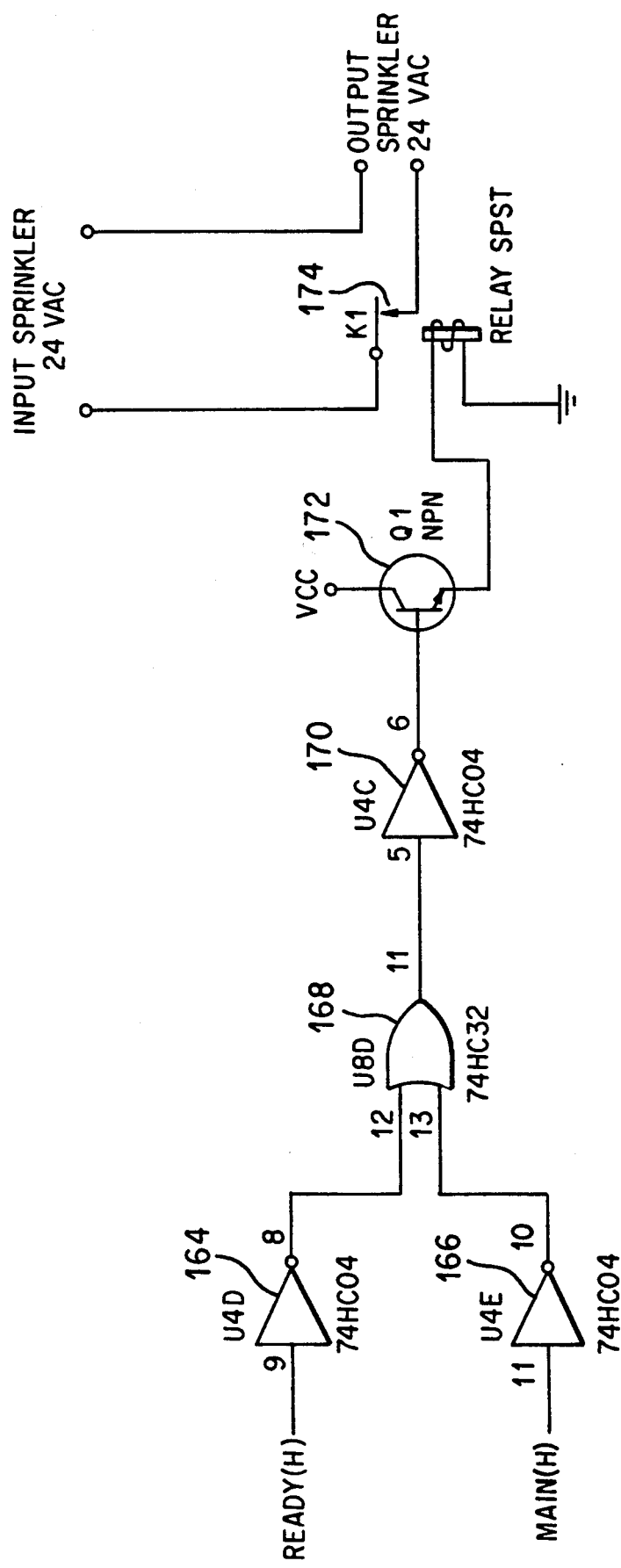
FIG. 9 is a circuit diagram of the output module of the present invention.

The purpose of the output module 64 is to, either interrupt the flow of power to the solenoid valves 28, 30 to prevent water from irrigating a particular area, or to allow power to be transmitted to these valves, thereby allowing the area to be irrigated. A high ready signal is received by the output module 64 from the controller module 60 and a high main signal is received by the output module 64 from the input module 56. The circuit diagram of the output module 64 is illustrated in FIG. 9. This figure includes logical gates 164, 166 and 168 to form the logical product of the high ready signal and the high main signal. An amplifier 170, transistor 172 and relay 174 are used to actually switch the 24 volt alternating current solenoid power. Whenever the relay 174 is energized, the solenoid power circuit is closed. Therefore, it can be seen that only when both a high ready and high main signal are sent to the output module 64, would the relay 174 be energized and water supplied to an irrigated area.

The rain delay module 14 can also be provided with a display module 66 which would visually or aurally indicate the current status of the rain delay module 14. This module could also display information regarding the tip bucket count, the solenoid power status, the battery charge status as well as other information relating to the entire system.

Contrary to prior art automatic sprinkling or irrigation systems, the present invention operates by automatically decrementing a counter only during the time that an irrigation event is scheduled. Therefore, before the system according to the present invention becomes operational, an irrigation event schedule should be determined. This schedule would be predicated upon many variables, such as the type of crops or vegetation which must be watered, the type of soil, the time of day, and position of the sun, as well as a number of additional environmental considerations. This irrigation event schedule can be provided as an automatic or manual external input to the input module or can be implemented internally in the input module. In any of these situations, a high main output signal directed to the output module 64 would be present whenever such an event is scheduled. At this point, the controller module 60 would check the status of the tip bucket counter in the counter module 58. If the counter is set at zero, a ready signal is presented to the output module 64 which would allow the main power signal to pass uninterruptedly through the rain delay module to one or more of the solenoid controlled water supply systems. If the tip counter of the counter module 58 is greater than zero, a trigger signal is produced between the controller module 60 and the alarm module 62 which would allow the timer provided therein to begin to charge a capacitor. When the charge in this capacitor exceeds a particular level, an alarm signal would result between the alarm module 62 and the controller module 60, thereby producing a signal used to decrement the tip bucket counter in the counter module 58. It is important to note that this decrement cycle would only take place when a main power signal, indicating the presence of a scheduled irrigation event, through the input module is directed to the controller module. If this main power signal is not received by the controller module 60, the tip bucket counter in the counter module 58 would not be decremented. This system should be contrasted with the prior art systems in which precipitation collected in a container would be constantly or in a stepwise manner released from this container.

The rate at which the counter 100, 102 is decremented is calibrated to match the application area. This calibration is effected by requiring the duration of an alarm cycle to be determined by the adjustable resistor 152. The system is calibrated in units of seconds/tip. Each closure of the tip bucket switch 68 will disable the solenoid activation power for a specific amount of time. This calibration setting is determined by placing the tip bucket 16 such that it receives water from the irrigation system at the rate the water is normally applied. In this position, the number of seconds required to trigger the tip bucket is the correct calibration setting.

While the invention has been particularly shown and described in reference to the preferred embodiment thereof, it should be understood by those skilled in the art that the foregoing other changes in form and details may be made without departing from the spirit and scope of the invention. For example, although the rain delay device of the present invention as described herein is implemented utilizing an electronic counter, the present invention could operate utilizing a completely mechanical and electromechanical device. For example, a collection tube similar to the one described in U.S. Pat. No. 2,776,860 to Griffis could be modified by placing a solenoid valve just below the drip valve. If this solenoid valve were only open during a scheduled irrigation event, then the water could only drip out during this event. This system would provide functionality completely analogous to the present electronic implementation.

What is claimed is:

1. A method of automatically irrigating a plot of land utilizing at least one source of water, each of which is controlled by a solenoid valve including the steps of:
    determining a schedule of irrigation events, during which the plot of land is provided with water;
    providing a module including a counter between a source of power for activating the solenoid valves and the solenoid valves;
    sensing the amount of precipitation which has fallen in a given area during a predetermined time period;
    providing an output to said counter based upon a signal provided during said sensing step;
    incrementing said counter based upon said signal provided during said sensing step;
    determining a rate for decrementing said counter, said rate included in said module;
    decrementing said counter only during a scheduled irrigation event, and only if the count in said counter equals said predetermined value; and
    providing an output signal to activate each of said solenoid valves if, during the scheduled irrigation event, the count is said counter equals said predetermined value.

2. The method in accordance with claim 1, further including the step of displaying the operating state of said module.

3. A system for automatically irrigating a plot of land by controlling the operation of one or more solenoid valves, each of which is associated with a source of water, and controlled by a source of power, comprising:
    a precipitation sensor providing an output based upon the amount of precipitation which has fallen in a given area during a particular time period;
    a module provided between the source of power and the one or more solenoid valves and connected to said precipitation sensor for initiating the activation of the solenoid valves at the appropriate time for irrigating the plot of land, said module provided with a counter which is incremented based upon the output of said precipitation sensor;
    a scheduler associated with said module and the source of power for producing a signal indicating the presence of a scheduled irrigation event, indicating that the plot of land is scheduled to be irrigated at a particular time;
    a means provided in said module for decrementing said counter only during the scheduled irrigation event, and only if the count in said counter exceeds a predetermined value; and
    an output device provided in said module and connected to said counter for activating the solenoid valves if, during the scheduled irrigation event, the count in said counter equals said predetermined value.

4. The system in accordance with claim 1, wherein said schedule is provided within said module.

5. The system in accordance with claim 1, further including a display module connected to said output device for displaying the operating state of said module.

6. The system in accordance with claim 1, wherein said module is provided with an internal power supply.

7. The system in accordance with claim 1, wherein said means for decrementing said counter is provided with a calibration device for altering the rate said counter is decremented.

8. The system in accordance with claim 1, wherein said precipitation sensor is a tip bucket sensor.

9. A system for automatically irrigating a plot of land, comprising:
    one or more sources of water for irrigating the plot of land;
    a solenoid valve connected to each of said sources of water for controlling the activation of each of said sources of water;
    a precipitation sensor providing an output based upon the amount of precipitation which has fallen in a given area during a particular time period;
    a source of power connected to each of said solenoid valves for controlling the activation of each of said sources of water;
    a module provided between said source of power and said solenoid valves, said module connected to said precipitation sensor for initiating the activation of said solenoid valves at the appropriate time for irrigating the plot of land, said module provided with a counter which is incremented based upon the output of said precipitation sensor;
    a scheduler associated with said module for providing a signal indicating the presence of a scheduled irrigation event, indicating that the plot of land is scheduled to be irrigated at a particular time;

a means provided in said module for decrementing said counter only during the scheduled irrigation event, and only if the count in said counter exceeds a predetermined value; and an output device provided in said module and connected to said counter for activating said solenoid valves if, during the scheduled irrigation event, the count in said counter equals said predetermined value.

10. The system in accordance with claim 9, wherein said schedule is provided within said module.

11. The system in accordance with claim 9, further including a display module connected to said output device for displaying the operating state of said module.

12. The system in accordance with claim 9, wherein said module is provided with an internal power supply.

13. The system in accordance with claim 9, wherein said means for decrementing said counter is provided with a calibration device for altering the rate said counter is decremented.

14. The system in accordance with claim 9, wherein said precipitation sensor is a tip bucket sensor.

* * * * *